W. DUNCAN.
BRUSH RAKE.
APPLICATION FILED FEB. 26, 1919.

1,323,460.

Patented Dec. 2, 1919.

INVENTOR
William Duncan
BY
Francis C Huebner
ATTORNEY

UNITED STATES PATENT OFFICE.

WILLIAM DUNCAN, OF FRESNO, CALIFORNIA.

BRUSH-RAKE.

1,323,460.   Specification of Letters Patent.   Patented Dec. 2, 1919.

Application filed February 26, 1919.   Serial No. 279,466.

*To all whom it may concern:*

Be it known that I, WILLIAM DUNCAN, a citizen of the United States, and a resident of the town of Fresno, in the county of Fresno and State of California, have invented a new and useful Brush-Rake, of which the following is a specification.

My invention relates to rakes to be used for the purpose of gathering brush and vine cuttings and it is more especially adapted for use in vineyards and orchards to rake up the prunings for the purpose of burning them or hauling them from the vineyard or orchard.

Figure 1:
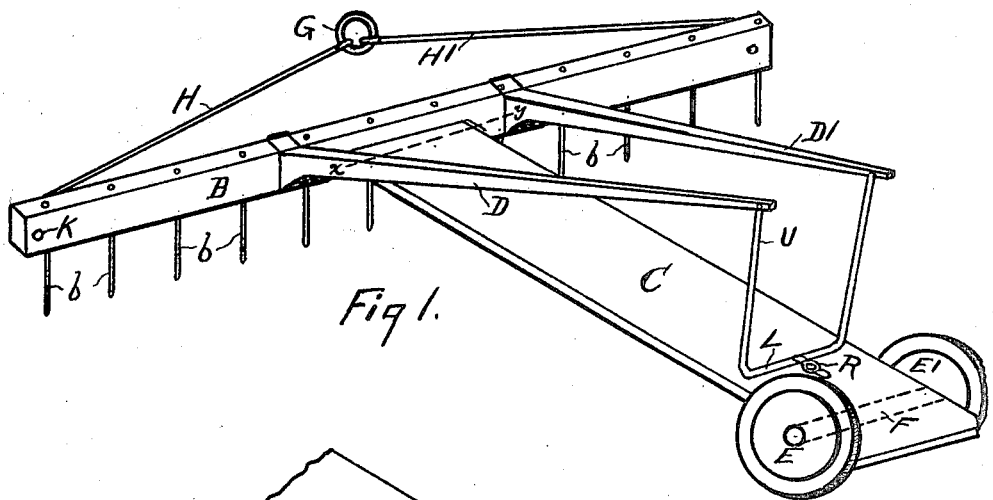
Figure 3:
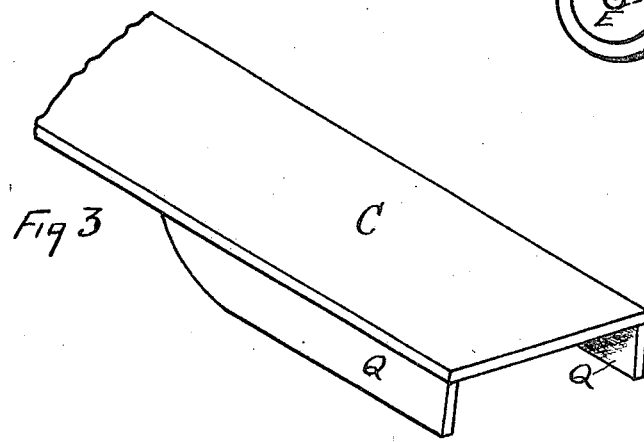
Figure 2:
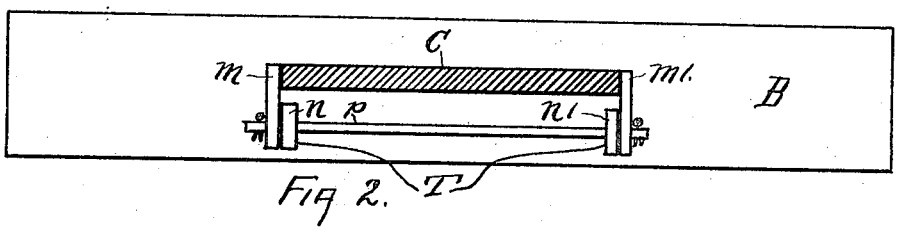

In the drawing accompanying this specification Figure 1 is a perspective view of the device complete. Fig. 2 is a view of the head of the rake showing a sectional view of the platform along the line $x-y$, and showing the hinge for attaching the platform to the head. Fig. 3 is a modified form of vehicle for the platform B, showing a slide in lieu of the wheels.

B indicates the head of the rake and $b, b$ are a plurality of teeth therein. C is a platform which is hinged at one end with hinge T hereinafter described in detail to the head of the rake. E and $E^1$ are wheels or rollers on an axle F which axle is attached to the platform at the end opposite to hinge T. The hinge T consists of two depending supports M and $M^1$ which are attached at each side of platform C and at the end thereof. N and $N^1$ are projections on head B, and $p$ is a rod or bolt passing through supports M and $M^1$ and projections N and $N^1$. It will be noted that the head can swing on the hinge T so that the teeth $b, b$, can turn to the rear and dump the brush raked, and can then swing forward to be in position for raking and dragging the vines together. D and $D^1$ are a pair of handles which are attached at one end to the head B and extend backward toward the rear end of the platform. These handles are connected with a U member shown at U which is pivoted at each of the upper ends to one of the handles. L is the lower portion of the U member. H and $H^1$ are rods attached with eye bolts K to head B and are joined at the other end to a common ring G. The power for dragging the rake is applied at ring G.

It will be observed that in using this rake when the U member rests on the platform the rake head and teeth are set at an angle so that on dragging the rake forward it is in a position for raking and the rake can be held rigidly in this position by the operator standing on the rod L. When it is desired to dump the rake the operator can raise the handles D and $D^1$ when the rake head will drag over the brush. It can then be adjusted for raking again by pulling the handles down again.

In Fig. 3 the sled runners Q are substituted for the wheels E and $E^1$. R is a catch by which the member U can be held rigidly to platform C if desired.

I claim as new and ask for Letters Patent upon:

In a brush rake the combination of a rake head, a plurality of teeth projecting therefrom, a platform extending toward the rear of the rake, one end of the platform being hinged to the head, handles being attached rigidly to the head and extending back in the same general direction as the platform when the teeth of the rake are approximately upright, and a U member, pivoted at each of the upper ends to one of the handles, and of such length that the bottom of the U member rests on the platform when the rake head is in a position so that the teeth lean slightly backward, means for holding the U member approximately rigidly to the platform when the teeth are in said position, and means for releasing the U member from the platform.

WILLIAM DUNCAN.

Witnesses:
  CLEO K. CURTIS,
  LAURA HOBÉ.